S. SHIPWASH.
TRACK GAGE.
APPLICATION FILED SEPT. 1, 1917.
1,285,431.
Patented Nov. 19, 1918.
2 SHEETS—SHEET 1.
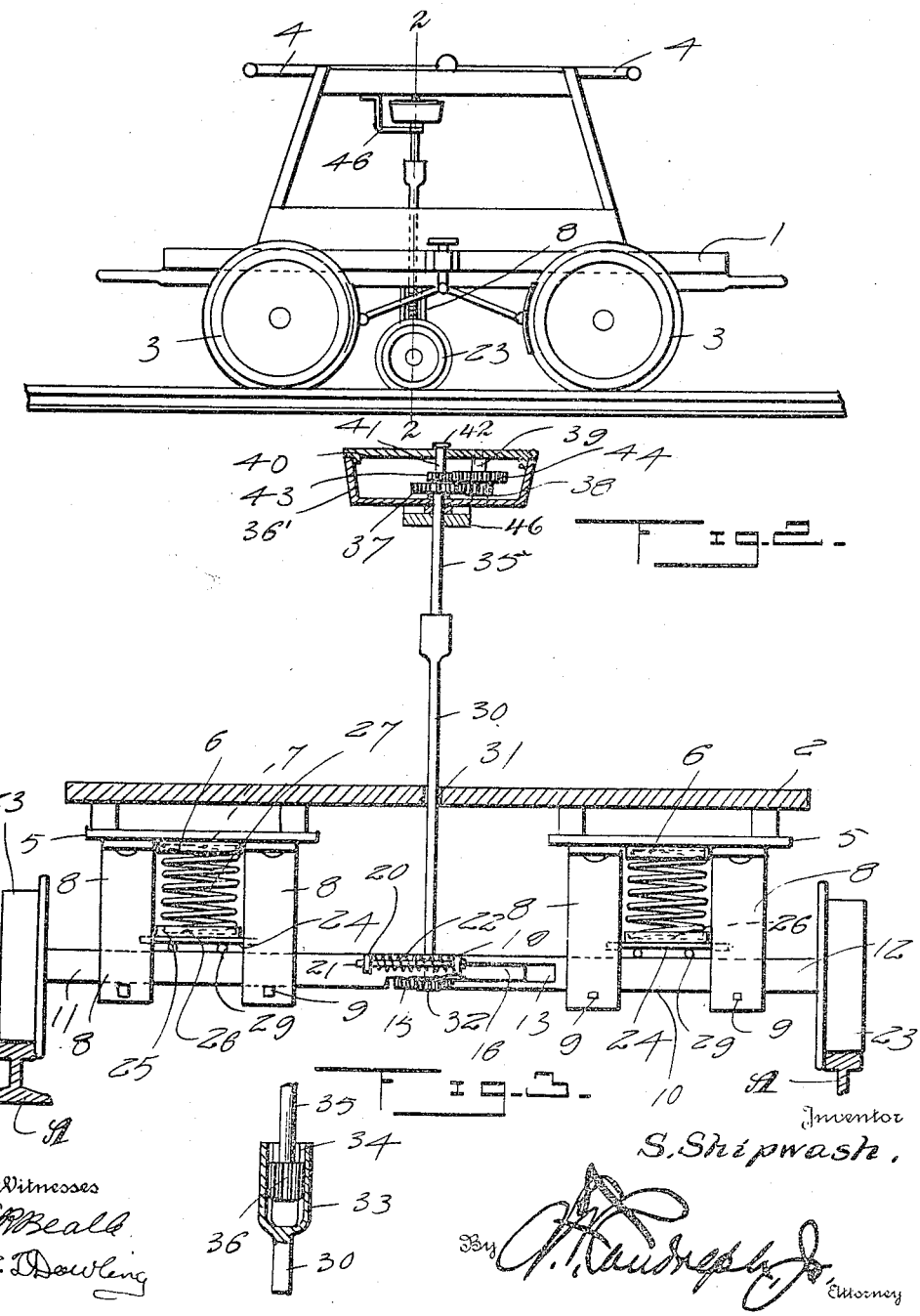

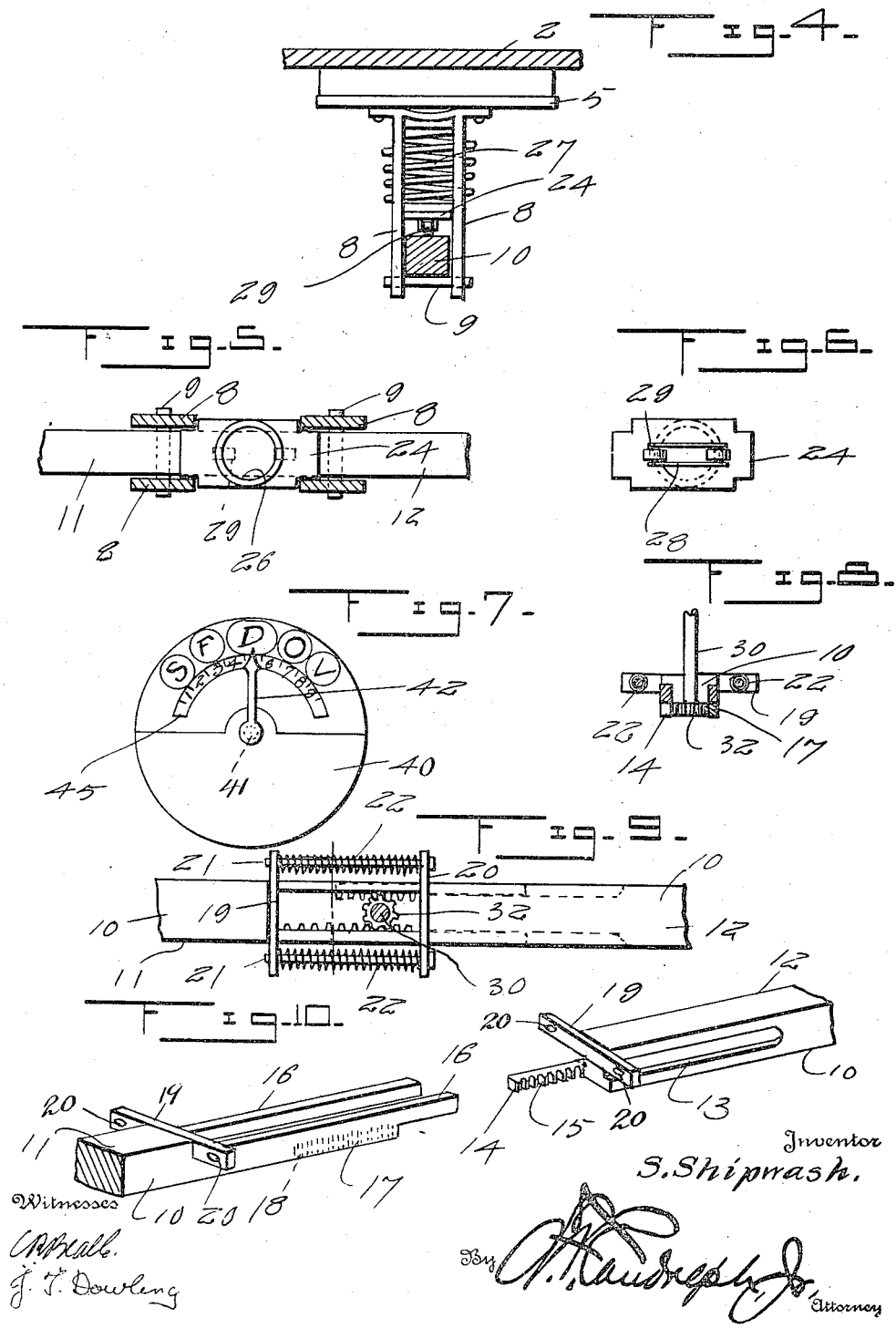

UNITED STATES PATENT OFFICE.

SCOTT SHIPWASH, OF COALFIELD, TENNESSEE, ASSIGNOR OF ONE-HALF TO SAMUEL JEAMS McGLOTHIN AND ONE-HALF TO LEE McGLOTHIN, BOTH OF COALFIELD, TENNESSEE.

TRACK-GAGE.

1,285,431.  Specification of Letters Patent.  Patented Nov. 19, 1918.

Application filed September 1, 1917. Serial No. 189,330.

*To all whom it may concern:*

Be it known that I, SCOTT SHIPWASH, a citizen of the United States, residing at Coalfield, in the county of Morgan and State of Tennessee, have invented certain new and useful Improvements in Track-Gages; and I do hereby declare the following to be a full, clear, and exact description of the invention, such as will enable others skilled in the art to which it appertains to make and use the same.

This invention relates to improvements in track gages.

The object of this invention is to provide a track gage especially constructed to be applied to a hand car or other type of car so that the track walker or other person may determine whether or not the rails are at the standard gage.

A still further object of this invention is to provide a gage equipped with a novel form of dial which is adapted to be located above the platform of a car to which it is attached so that the operator of the car may determine whether the rails are at the proper gage and thus avoid injury and wrecks.

A still further object of this invention is to provide a track gage of this character, which will be simple, practical, and comparatively inexpensive in construction, and one that can be manufactured and sold at a low cost.

With these and other objects in view, the invention consists in the novel combination and arrangement of parts hereinafter more fully described and set forth in the claims hereto appended.

In the drawings

Figure 1 is a side elevation of a hand car equipped with my improved track gage.

Fig. 2 is a transverse sectional view taken on the line 2—2 of Fig. 1,

Fig. 3 is a detail sectional view of the operating shaft illustrating the manner in which the shaft may be moved vertically, Fig. 4 is a sectional view of the platform illustrating the manner in which the gage shaft is resiliently supported, Fig. 5 is a top plan view of the spring seat, Fig. 6 is a bottom plan view of the spring seat, Fig. 7 is a top plan view of the dial, Fig. 8 is a detail sectional view illustrating the manner in which the shaft is positioned in mesh with the movable two part axle, Fig. 9 is a top plan view of the axle, and Fig. 10 is a perspective view of the two part axle showing the same separated.

Like numerals of reference designate corresponding parts in all the figures of the drawings.

Referring to the drawings, the numeral 1 designates the hand car in its entirety which is of the usual construction now in general use and to which my improved gage is shown applied. The hand car is provided with the usual platform 2 supported by the wheels 3 and has the usual operating handles 4.

My improved gage comprises a pair of rectangular plates 5 adapted to be secured to the under side of the platform 2 adjacent the side longitudinal edges thereof and in alinement with the transverse center of the platform. Each plate is provided on its under face centrally thereof with a bearing block 6 which blocks are provided with recesses 7.

A plurality of depending standards 8 are arranged in spaced pairs and each pair is secured to the under side of the plates 5 which depend downwardly therefrom. The pairs of standards 8 are located on opposite sides of the bearing blocks 6 as illustrated in Fig. 2 of the drawings.

A transverse pin 9 extends transversely through and connects the terminals of each pair of standards 8 together as illustrated more clearly in Fig. 4 these pins 9 constituting supports for the squared gage axle 10.

The gage axle 10 comprises sections 11 and 12 respectively. The section 12 is provided with a longitudinally extending channel 13 on its opposite side faces at the inner ends thereof, and the opposing end of the section 12 is provided with a rectangular extension 14 which has its inner face provided with teeth 15. The section 11 has its inner end reduced to provide the longitudinally relatively spaced arms 16, which arms are adapted to be slidably arranged in the longitudinally extending channel 13 in the section 12. One of the arms 16 has provided on its under side and depending downwardly therefrom, the extension 17 which is provided on its inner face with teeth 18 which are adapted to aline with the teeth 15 on the bar 14 of the section 12 of the axle, when the sections are assembled. The opposing ends of each of the sections 11 and 12 respectively are provided adjacent the upper side with the supporting bars 19 which extend laterally beyond the opposite side faces of each of the sections 11 and 12 respectively and are provided with alined apertures 20. Longitudinally extending pins 21 extend through the alined apertures 20 of each of the supporting bars 19 removably connecting the sections together and limiting the movement of the sections with relation to each other. Coil springs 22 surround each of the pins and abut the opposing faces of the bars 19 so as to normally hold the sections at a predetermined distance apart which distance is to constitute the standard gage of the rails, designated A in the drawings.

Each of the sections 11 and 12 respectively are provided on their outer ends with flanged wheels 23 which are adapted to ride upon the ball of the rails A to determine whether or not the rails are in the proper or standard gage. The sections 11 and 12 of the axle are supported by the pins 9 connecting the lower ends of the standards 8 together.

A rectangular supporting plate 24 is movably mounted between the pairs of standards 8 as illustrated in Fig. 2 of the drawings.

Each supporting plate 24 is provided on its upper face with a bearing block 25 which is provided with a recess 26 which opposes the recess 7 in the bearing block 6 on the plates 5. The coil springs 27 are arranged between the opposing faces of the bearing blocks 6 and 25 respectively and the terminals of the springs rest in the recesses 7 and 26 respectively of the bearing blocks, thus it can be seen that the supporting plates 24 are movable toward and away from the stationary plates 5, thus permitting the axle sections to give vertically due to the manner in which the road bed is constructed.

The under sides of the plates 24 are provided with longitudinally extending relatively spaced ribs 28, which ribs have journaled between the opposing faces pairs of relatively spaced rollers 29, which rollers are adapted to bear upon the upper sides of the axle sections 11 and 12 respectively to normally urge the wheels 23 into engagement with the balls of the rails A by virtue or through the medium of the coil springs 27.

A shaft 30 is rotatably mounted centrally through the platform 2 as at 31. The lower end of the shaft has secured thereto a gear wheel 32 which is adapted to be disposed between the opposing faces of the extensions 14 and 17 of the axle sections 11 and 12 respectively. The gear 32 is adapted to mesh with the teeth 15 and 18 respectively and upon movement of the axle sections either outwardly or inwardly according to the gage of the rails A the shaft will be rotated in a like manner.

The upper end of the shaft 30 is provided with an elongated tubular extension 33 which is provided on its interior with vertically extending teeth 34. An operating shaft 35 has secured to its lower end a gear 36, which gear is located in the tubular extension 33 and meshes with the teeth 34 and the depth or length of the tubular extension 33 permits vertical movement of the shaft 30 with relation to the shaft 35. The upper end of the shaft 35 extends through the bottom wall of the casing 36' and has secured to its terminal a gear 37 which is adapted to mesh with a smaller gear 38 carried by the stub shaft 39 which is secured to the under side of the dial 40 which is secured to the upper edges of the casing 36'. A shaft 41 is rotatably mounted centrally through the dial 40 and has secured to its outer end and movable over the face of the dial a pointer hand 42. The inner end of the shaft 41 has secured thereon a gear 43 adapted to mesh with a relatively large gear 44 which is secured to the stub shaft 39 above the gear 38, so, upon the rotation of the shaft 35, the gear 37 will be rotated which meshes with the gear 38 thus driving the stub shaft 39 which in turn rotates the gear 44 and this rotates the shaft 41 and moves the pointer or indicating hand 42 over the face of the dial and indicates the exact gage of the rails A. It is to be understood that when the rails A are in a normal gage or standard gage, the hand remains in the central portion of the arcuately arranged characters 45 located on the upper face of the dial. It is also to be understood that upon movement of the sectional shaft, the axle 10 compensates for the variance between the rails A, that the pointer hand 42 will be moved over the face of the dial in either direction and that it will indicate to the persons upon the hand car that the track at that point is out of gage. The rails can then be reset to the proper gage, which proper gage will position the rod or pointer hand 42 centrally of the characters 45 and denote to the operator that the rails A are at the standard gage again.

The operating shaft 35 is supported by a bracket 46 which has one end secured to the car and its opposite end rotatably secured about the shaft 35 as illustrated in Fig. 2. It will also be understood that the train of gearing located in the casing permits of the accurate rotation of the dial shaft 41 and pointer hand 42.

It will be apparent that a gage constructed in accordance with this invention, taken in connection with the accompanying drawings, will determine the exact gage of the rails and thus avoid injury and wrecks to trains passing over the tracks due to the fact that the rails are in gage.

What is claimed is:—

1. A track gage including a car, a sectional axle secured to the under side of the car, a shaft mounted between the opposed inner ends of the sectional axle, means carried by the inner end of the axle for rotating the shaft and a dial having a pointer hand adapted to be actuated by the rotation of the shaft, as and for the purpose specified.

2. A track gage including a car, a sectional axle journaled upon the under side of the car, the inner ends of the axle slidably connected together, wheels on the outer ends of the axle and adapted for rotating along the rails, means for resiliently supporting the axle and wheels upon the rails, rack bars carried by the inner opposed ends of the axle, a shaft rotatably mounted through the platform of the car, a gear on the lower end of the shaft and meshing with the rack bars, a casing, a dial secured to the casing, means for supporting the casing and dial in alinement with the shaft, and a pointer hand rotatably actuated by the shaft and movable over the dial, as and for the purpose specified.

3. A track gage including the combination with a car, of a sectional axle journaled to the under side of the platform of the car, resilient means interposed between the axle and the under side of the car, wheels carried by the outer ends of the axle and bearing upon the rails, said resilient means urging the wheels into contact with the rails, toothed bars carried by the inner ends of each axle section, a shaft, a gear on the lower end of the shaft and disposed between and in mesh with the teeth of the rack bars, a second resilient means connecting the sectional axle together, a second shaft operated by the first named shaft, a casing surrounding the upper end of said second named shaft, gears located in said casing, a gear on the upper end of said second named shaft and meshing with the gears of the casing, a dial secured to the casing, a third shaft mounted centrally of the dial, a gear on said shaft meshing with the gears in the casing, a pointer hand located on said last named shaft and operating over the face of the dial, and said pointer hand adapted to be operated by movement of the sectional axle which rotates the first named shaft, as and for the purpose specified.

4. A track gage comprising a sectional axle adapted to be journaled beneath the under side of the platform of a car, resilient means interposed between the axle and the platform of the car, wheels on the outer ends of the axle and adapted to bear upon the rails of a track, said resilient means normally urging the wheels into engagement with the balls of the rails, a second resilient means connecting the inner opposed ends of the sectional axle together, toothed bars carried by the inner end of each section, said bars arranged at spaced distance apart with their toothed sides opposing, a shaft rotatably mounted and extending through the platform of the car, a gear on the lower end of the shaft and disposed between the toothed bars of the axle and meshing therewith, an elongated tubular extension on the upper end of the shaft and provided with interior teeth, a second shaft, a gear on the lower end of the second named shaft and mounted in the tubular extension and meshing with the teeth thereof, a gear on the upper end of the second named shaft, a casing surrounding said gear, a dial secured to the casing, a stub shaft secured to the dial and depending in the casing, a pair of gears secured to the stub shaft and one of said gears meshing with the gear on the upper end of the second named shaft, a third shaft rotatably mounted centrally through the dial, a gear on the inner end of the third shaft and meshing with one of the gears of the stub shaft of the dial, a pointer rod secured to the upper end of the third shaft and movable over the face of the dial, said pointer adapted to determine the gage of the rails by movement of the sectional axle which rotates the first named shaft, as and for the purpose specified.

5. A track gage including a car, a sectional axle secured to the underside of the car, a shaft rotatably mounted through the platform of the car, a gear on the lower end of the shaft and meshing with rack bars on the inner opposing ends of the axle, a second shaft rotatably mounted upon the first shaft, a casing mounted upon the second shaft, a dial carried by the casing, and means located in the casing and actuated by the second shaft for operating a hand over the dial.

In testimony whereof I affix my signature in presence of two witnesses.

SCOTT SHIPWASH.

Witnesses:
HERBERT WARD,
DORAH ADCOCK.

Copies of this patent may be obtained for five cents each, by addressing the "Commissioner of Patents, Washington, D. C."